United States Patent

Yamanouchi et al.

[15] 3,700,750

[45] Oct. 24, 1972

[54] STABILIZED POLYPHENYLENE OXIDE COMPOSITION

[72] Inventors: Saburo Yamanouchi, Kobe; Kiyoshi Yasuno, Ibaragi; Kou Sota, Yamatokohriyama; Takuzo Okumura, Takatsuki, all of Japan

[73] Assignee: Sumitomo Chemical Company Limited, Osaka, Japan

[22] Filed: Dec. 29, 1970

[21] Appl. No.: 102,509

[30] Foreign Application Priority Data

Jan. 7, 1970 Japan ..................45/2630
Jan. 9, 1970 Japan ..................45/3087

[52] U.S. Cl..........260/874, 260/45.7 P, 260/45.7 PS, 260/45.75 R, 260/45.75 C, 260/45.75 K, 260/45.8 N, 260/45.8 SN, 260/45.85, 260/45.9 R, 260/45.95, 260/887
[51] Int. Cl...........................C08g 43/02, C08d 9/10
[58] Field of Search..............260/874, 29.6 NR, 45.7 S, 45.75 K

[56] References Cited

UNITED STATES PATENTS

| | | |
|---|---|---|
| 3,487,127 | 12/1969 | Erchak et al. ............ 260/876 |
| 3,384,682 | 5/1968 | Erchak et al. ............260/874 |
| 3,245,923 | 4/1966 | Manzella et al. ...........260/2.5 |
| 3,001,969 | 9/1961 | Tholstrop et al. .......260/45.75 |

*Primary Examiner*—Murray Tillman
*Assistant Examiner*—John Seibert
*Attorney*—Stevens, Davis, Miller & Mosher

[57] ABSTRACT

A stabilized composition of modified polyphenylene oxide comprising a graft polymer obtained by polymerizing a styrene-type compound in the presence of a polyphenylene oxide with or without a rubber-like polymer and incorporated with (a) 0.1 to 10 percent, preferably 0.5 to 7 percent by weight of a sterically hindered phenol and (b) 0.1 to 10 percent, preferably 0.5 to 7 percent by weight of at least one compound selected from the group consisting of thioethers of carboxylic acid esters, trialkyl or triaryl phosphites, trialkyl or triaryl thiophosphites, and arylamines; or alternatively, incorporated with (c) 0.1 to 10 percent, preferably 0.5 to 7 percent by weight of at least one compound selected from the group consisting of metal salts of dithiocarbamic acids, 2-mercaptoimidazoline, and zinc salt of mercaptobenzothiazole.

The said stabilized composition has an excellent thermal stability and its impact resistance will hardly be deteriorated when heated at high temperatures for a long period of time.

13 Claims, No Drawings

STABILIZED POLYPHENYLENE OXIDE COMPOSITION

The present invention relates to a stabilized composition comprising a graft polymer (hereinafter referred to as modified polyphenylene oxide) obtained by polymerizing a styrene-type compound in the presence of a polyphenylene oxide with or without a rubber-like polymer.

The modified polyphenylene oxide is obtained by, for example, a process described in Japanese Pat. application Nos. 56,501/68 and 525/69, and has characteristic properties, particularly an excellent processability and a high impact strength, without being much deteriorated in the excellent heat distortion resistance of polyphenylene oxide. Hence, the modified polyphenylene oxide is a very useful industrial thermoplastic resin and has shown, in recent years, a remarkable inroad into fields of electrical appliance parts, mechanical parts, and building materials.

However, as has heretofore been widely known, polyphenylene oxide is unstable against heat and light, becoming brown in color and brittle under the influence of heat and light. On the other hand, it is also well known that the stabilities against heat and light of the molecular chain of styrene-type compounds and the rubber-like polymer, which are coexisting in the modified polyphenylene oxide, are not always so good, and especially the rubber-like polymer is very unstable against heat and light.

Because of its high resistance to heat distortion, the modified polyphenylene oxide is required to stand a long period of use at high temperatures. Unless it can stand a long period of use, the merits of the polymer cannot be displayed. The cause and mechanism of deterioration of polyphenylene oxide are not clear, but it is said that the deterioration is due to the sensitive reaction of hydroxyl groups in the polymer chain with oxygen in air, or to the degradation-promoting action caused by the presence of a minute amount of impurities in the polymer. Concerning the stabilizing method for polyphenylene oxide itself, there has already been proposed the addition of various compounds. (However, as is seen from the description in U.S. Pat. No. 3,465,062 that the phenolic compounds, which have hitherto been known useful for styrene-type polymers and rubber-like polymers, are ineffective for polyphenylene oxide, the stabilization mechanism in polyphenylene oxide seems different from that in styrene-type polymers or in rubber-like polymers.)

The present inventors have found out a method for stabilizing the modified polyphenylene oxide composed of polyphenylene oxide, molecular chains of a styrene-type compound and a rubber-like polymer. According to this method the indigenous properties characteristic to the modified polyphenylene oxide seems to be retained by simultaneous stabilization of at least two of the components, because such a retaining effect is unexpectable from the simple stabilization of polymer chains of only one of the components.

The present invention relates to a composition comprising a graft polymer which is obtained by polymerizing a styrene-type compound in the presence of a polyphenylene oxide with or without a rubber-like polymer and is incorporated with (a) a sterically hindered phenol and (b) at least one compound selected from the group consisting of thioethers of carboxylic acid esters, trialkyl or triaryl phosphites, trialkyl or triaryl thiophosphites, and arylamines; or alternatively, incorporated with (c) at least one compound selected from the group consisting of metal salts of dithiocarbamic acids, 2-mercaptoimidazoline, and zinc salt of mercaptobenzothiazole; the amount of each of (a), (b) and (c) being 0.1 to 10 percent by weight, preferably 0.5 to 7 percent by weight. The sterically hindered phenols for use in this invention include monophenols represented by the general formula,

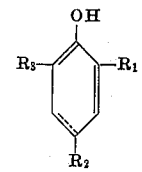

wherein $R_1$ and $R_3$ are hydrocarbon groups having one to 20 carbon atoms, and $R_2$ is a hydrogen atom or a hydrocarbon group having one to 20 carbon atoms; bisphenols represented by the general formula,

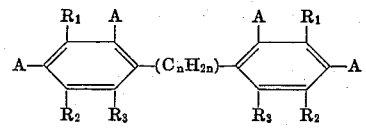

wherein $R_1$, $R_2$ and $R_3$ are hydrogen atoms or hydrocarbon groups having one to 20 carbon atoms, one of two A's in each ring is a hydroxyl group, the other A in each ring is the same as $R_1$, $R_2$ or $R_3$, and $n$ is an integer of 0 to 20; trisphenols represented by the general formula,

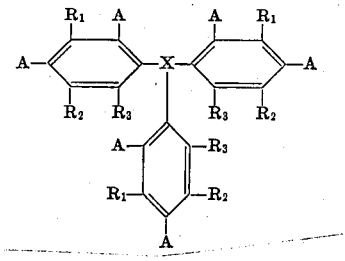

wherein $R_1$, $R_2$ and $R_3$ are hydrogen atoms or hydrocarbon groups having one to 20 carbon atoms, one of two A's in each ring is a hydroxyl group and the other A in each ring is the same as $R_1$, $R_2$ or $R_3$, and X is a trivalent hydrocarbon group having one to 20 carbon atoms; trisphenols represented by the general formula,

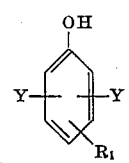

wherein $R_1$ is a hydrocarbon group having one to 20 carbon atoms, Y is a group of the formula,

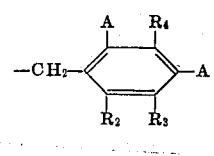

wherein each of $R_2$, $R_3$ and $R_4$ is a hydrogen atom or a hydrocarbon group having one to 20 carbon atoms, one of two A's is a hydroxyl group and the other A is the same as $R_2$, $R_3$ or $R_4$; and thiobisphenols.

More particularly, as the sterically hindered monophenols, may be listed 2-methyl-6-tert-butylphenol, 2,6-di-tert-butylphenol, 2,6-di-tert-butyl-p-cresol, 2,6-dicyclohexyl-p-cresol, 2,6-diisopropyl-4-ethylphenol, 2,6-di-tert-amyl-p-cresol, 2,6-di-tert-octyl-4-n-propyl-phenol, 2,6-dicyclohexyl-4-n-octylphenol, 2-isopropyl-4-methyl-6-tert-butylphenol, 2-isobutyl-4-ethyl-6-tert-hexylphenol, 2-tert-butyl-4-ethyl-6-tert-octylphenol, 2-cyclohexyl-4-n-butyl-6-isopropylphenol, and 2,6-di-tert-butyl-4-laurylphenol. When an alkyl group is at 4-position, this alkyl may have one to 20 carbon atoms, and each of the other two hydrocarbon groups at 2- and 6-position is preferably a sec.- or tert-alkyl group, or a cyclic hydrocarbon group.

As the sterically hindered bisphenols there may be listed 2,2'-methylenebis(4-methyl-6-tert-butylphenol), 4,4'-isopropylidenebis(2-tert-butylphenol), 4,4'-methylenebis(2,6-di-tert-butylphenol), 2,2'-methylenebis(p-cresol), 2,2'-methylenebis(4,6-dimethylphenol), 4,4'-methylenebis(6-tert-butyl-o-cresol), 2,2'-ethylidenebis(4,6-dimethylphenol), 2,2'-ethylidenebis(4-methyl-6-tert-butylphenol), 4,4'-bis(2-methyl-6-tert-butylphenol), 4,4'-bis(2,6-di-tert-butylphenol), and 2,2'-bis(4-methyl-6-tert-butylphenol).

Among the sterically hindered trisphenols there are 1,1,3-tri(3-tert-butyl-4-hydroxyphenyl)-butane, 1,1,3-tri(2-methyl-4-hydroxy-5-tert-butyl)butane, 2,6-di(2-hydroxy-5-methylbenzyl)-4-methylphenol, 2,6-di(4-hydroxybenzyl)-4-methylphenol, 2,6-di(2-hydroxy-3-tert-butyl- 5-methylbenzyl)-4-methylphenol, and 2,6-di(2-hydroxy-3-tert-butyl-5-methyl-benzyl)-4-nonylphenol.

As the thiobisphenols, may be listed 2,2'-thiobis(4-methyl-6-tert-butylphenol), 2,2'-thiobis(4-isopropyl-6-tert-butylphenol), 4,4'-thiobis(3-methyl-6-tert-butylphenol), and 4,4'-thiobis(3-methyl-6-tert-amylphenol).

The compounds of group (b) for use in this invention include thioethers of carboxylic acid esters represented by the general formula,

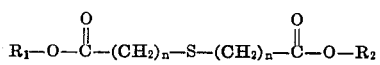

wherein $R_1$ and $R_2$ are hydrocarbon groups having six to 20 carbon atoms, and $n$ is an integer of one to 20, preferably one to six; trialkyl or triaryl phosphites and trialkyl or triaryl thiophosphites represented by the general formulas,

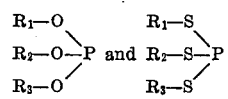

respectively, wherein $R_1$, $R_2$ and $R_3$ are aliphatic or aromatic hydrocarbon groups having six to 20 carbon atoms; and arylamines represented by the general formula,

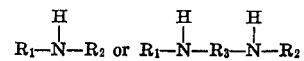

wherein $R_1$ and $R_2$ are aromatic hydrocarbon groups having six to 10 carbon atoms, and $R_3$ is an aromatic hydrocarbon group having six carbon atoms.

As the thioethers of carboxylic acid esters, may be listed dilauryl thiodipropionate, distearyl thiodipropionate, dihexyl-thiodibutyrate, dibutyl thiodicaproate, etc.

As the trialkyl or triaryl phosphites, may be listed trilauryl phosphite, tristearyl phosphite, tribenzyl phosphite, tricyclohexyl phosphite, tripalmityl phosphite, tri(2-ethylhexyl) phosphite, tri(2,4-di-tert-butyl-5-methylphenyl) phosphite, etc.

As the trialkyl trithiophosphites, may be listed trilauryl trithiophosphite, tristearyl trithiophosphite, tribenzyl trithiophosphite, tricyclohexyl trithiophosphite, tripalmityl trithiophosphite, etc.

As the arylamines, may be listed phenyl-α-naphthylamine, phenyl-β-naphthylamine, N,N'-di-β-naphthyl-p-phenylenediamine, N,N'-diphenyl-p-phenylenediamine, etc.

The compounds of group (c) for use in this invention include metal salts of dithiocarbamic acids represented by the general formula,

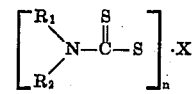

wherein $R_1$ and $R_2$ are aliphatic hydrocarbon groups having one to five carbon atoms, or either one of $R_1$ and $R_2$ is an aromatic hydrocarbon group and the other is an aliphatic hydrocarbon group having one to five carbon atoms, X is a metallic element selected from Zn, Sn, Cu, Ce, and Te, and $n$ is an integer corresponding to the valency of the metallic element; 2-mercaptoimidazoline; and zinc salt of mercaptobenzothiazole.

The typical metal dithiocarbamate for use in this invention are zinc dimethyldithiocarbamate, zinc diethyldithiocarbamate, zinc ethylphenyldithiocarbamate, zinc dibutyldithiocarbamate, copper dimethyldithiocarbamate, cerium diethyldithiocarbamate, tellurium diethyldithiocarbamate, etc.

The addition of these compounds may be carried out by any method which is usually used industrially. For example, the compound is added to the modified polyphenylene oxide in powder form or granular form, mixed in a Henschel mixer, and then milled by means of a roller mill or an extruder. Alternatively, the compound is added to a solution of the modified polyphenylene oxide in a suitable solvent, and then the stabilized composition of the modified polyphenylene oxide is isolated from the solution.

The addition of lubricants, fillers, pigments, etc., in amounts usually used industrially, to the present composition does not interfere with the object of this invention.

The invention is illustrated below with reference to Examples which are presented merely illustrative and many modifications may be made within the scope of this invention.

In the Examples the impact strength is Dynstat impact strength measured at 20° C according to the method of BS 1330, and the amount of additives used is given in per cent by weight based on the modified polyphenylene oxide.

EXAMPLES 1–4

Various compounds were added to a modified polyphenylene oxide powder having an intrinsic viscosity of 0.65 dl/g as measured in chloroform at 25° C and composed of 57 percent by weight of 2,6-dimethyl-1,4-phenylene oxide component, 38 percent by weight of styrene component, and 5 percent by weight of butadiene component. Each mixture was milled for 5 minutes on a two-roller mill adjusted to a surface temperature of 210° C. The resulting composition was compression molded at 220° C for 10 minutes to obtain a sheet, 2 mm in thickness. The sheet was placed in a drying over, through which hot air at 150° C was circulated. Specimens of the sheet were taken out at given intervals and their Dynstat impact strengths were measured. The results obtained are as shown in Table 1.

Table 1 Impact strength, kg-cm/cm$^2$

| Example | Additive, % by weight | | Heatingtime(hour) | | | | | |
|---|---|---|---|---|---|---|---|---|
| | | | 0 | 1 | 5 | 7 | 10 | 15 | 20 |
| 1 | 2,6-Di-tert-butyl-4-methyl-phenol | 1.0 | 29.2 | 37.9 | 32.5 | 33.1 | 33.9 | 28.9 | 27.9 |
| 2 | Distearyl thiodipropionate | 1.0 | | | | | | | |
| | 2,2'-methylidenebis(6-tert-butyl-4-(methylphenol) | 1.0 | 30.5 | 30.3 | 29.2 | 28.1 | 28.0 | — | 28.1 |
| 3 | Distearyl thiodipropionate | 1.0 | | | | | | | |
| | 2,2'-methylidenebis(6-tert-butyl-4-methylphenol) | 1.0 | | | | | | | |
| | Trinonylphenyl phosphite | 0.5 | 35.1 | 29.9 | 32.9 | 30.5 | 28.6 | — | 27.7 |
| 4 | Distearyl thiodipropionate | 0.5 | | | | | | | |
| | 2,2'-methylidenebis(6-tert-butyl-4-methylphenol) | 0.5 | | | | | | | |
| | Phenyl-β-naphthyl-amine | 0.5 | 31.5 | 35.7 | 29.6 | 32.6 | 31.0 | — | 29.0 |
| Control | Distearyl thiodipropionate None | | 22.4 | 12.4 | 6.5 | 7.4 | 6.7 | 6.9 | 6.3 |

EXAMPLES 5–8

In a manner similar to that in Examples 1–4, various compounds were added and milled to obtain each composition. The resulting composition was compression molded at 220°, 250° and 290° C for 10 minutes to obtain each sheet, 2 mm in thickness. The Dynstat impact strength was measured on each sheet. The results obtained are as shown in Table 2.

Table 2 Impact strength, kg-cm/cm$^2$

| Example | Additive, % by weight | | Molding temperature, °C | | |
|---|---|---|---|---|---|
| | | | 220 | 250 | 290 |
| 5 | 2,6-Di-tert-butyl-4-methyl-phenol | 1.0 | 29.2 | 21.5 | 21.3 |
| | Distearyl thiodipropionate | 1.0 | | | |
| 6 | 2,2'-Methylidenebis(6-tert-butyl-4-methylphenol) | 1.0 | 30.5 | 30.0 | 28.1 |
| | Distearyl thiodipropionate | 1.0 | | | |
| 7 | 2,2'-Methylidenebis(6-tert-butyl-4-methylphenol) | 0.5 | | | |
| | Trilauryl thiophosphite | 0.5 | 31.0 | 28.7 | 25.6 |
| | Dilauryl thiodipropionate | 0.5 | | | |
| 8 | 1,1,3-Tris(2-methyl-4-hydroxy-5-tert-butylphenol)butane | 0.5 | | | |
| | N,N'-Di-β-naphthyl-p-phenylene-diamine | 0.5 | 30.8 | 27.6 | 24.2 |
| Control | Distearyl thiodipropionate None | 0.5 | 22.4 | 13.5 | 4.5 |

EXAMPLE 9

Each 1.0 percent by weight of various metal salts of dithiocarbamic acids were added to a modified polyphenylene oxide powder having an intrinsic viscosity of 0.65 dl/g as measured in chloroform at 25° C and composed of 57 percent by weight of 2,6-dimethyl-1,4-phenylene oxide component, 38 percent by weight of styrene component, and 5 percent by weight of butadiene component. Each mixture was milled for 5 minutes on a two-roller mill adjusted to a surface temperature of 210° C. The resulting composition was compression molded at 220° C for 10 minutes to obtain a sheet, 2 mm in thickness. The sheet was placed in a drying oven, through which hot air at 150° C was circulated. Specimens of the sheet were taken out at given intervals and their Dynstat impact strengths were measured. The result obtained are as shown in Table 3.

TABLE 3

| Heating time (hour) | Impact strength, kg.-cm./cm.² | | | | | | |
|---|---|---|---|---|---|---|---|
| | 0. | 0.5 | 1 | 2 | 10 | 15 | 20 |
| Additive: | | | | | | | |
| $\left[\begin{array}{c}C_2H_5\\ \phantom{x}\\ C_2H_5\end{array}\hspace{-6pt}N\!-\!\overset{\overset{S}{\|}}{C}\!-\!S\!-\!\right]_2\!\!Zn$ | 26.1 | 32.1 | 31.7 | 25.3 | 25.4 | | 21.5 |
| $\left[\begin{array}{c}\phantom{x}\\ \phantom{x}\\ C_2H_5\end{array}\hspace{-6pt}N\!-\!\overset{\overset{S}{\|}}{C}\!-\!S\!-\!\right]_2\!\!Zn$ (with phenyl) | 23.8 | 22.6 | 28.2 | 25.7 | 23.6 | 25.8 | |
| $\left[\begin{array}{c}CH_3\\ \phantom{x}\\ CH_3\end{array}\hspace{-6pt}N\!-\!\overset{\overset{S}{\|}}{C}\!-\!S\!-\!\right]_2\!\!Cu$ | 24.1 | 23.0 | 22.5 | 23.2 | | | 20.9 |
| $\left[\begin{array}{c}C_2H_5\\ \phantom{x}\\ C_2H_5\end{array}\hspace{-6pt}N\!-\!\overset{\overset{S}{\|}}{C}\!-\!S\!-\!\right]_4\!\!Ce$ | 22.3 | | 22.6 | 22.0 | | 21.1 | |
| $\left[\begin{array}{c}C_2H_5\\ \phantom{x}\\ C_2H_5\end{array}\hspace{-6pt}N\!-\!\overset{\overset{S}{\|}}{C}\!-\!S\!-\!\right]_4\!\!Te$ | 23.5 | 23.3 | 23.0 | 24.8 | 22.6 | | 20.3 |
| Control (no additive) | 22.4 | 12.4 | 10.3 | 6.5 | 6.7 | | 6.3 |

EXAMPLE 10

1.0 per cent by weight of each of 2-mercaptoimidazoline and zinc salt of mercaptobenzothiazole was added to a modified polyphenylene oxide powder having an intrinsic viscosity of 0.60 dl/g as measured in chloroform at 25° C and composed of 52 percent by weight of 2,6-dimethyl-1,4-phenylene oxide component, 43 percent by weight of styrene component, and 5 percent by weight of butadiene component. Thermal stabilities of both compositions were evaluated in a manner similar to that in Example 9. The results obtained are as shown in Table 4.

Table 4

| Heating time (hour) Additive | Impact strength, kg-cm/cm² | | | | | |
|---|---|---|---|---|---|---|
| | 0 | 5 | 7 | 10 | 15 | 20 |
| 2-Mercaptoimidazoline | 32.7 | 28.5 | 21.8 | 23.8 | 23.9 25.2 | |
| Zinc salt of mercaptobenzothiazole | 26.8 | 32.1 | 31.7 | 25.3 | — | 25.4 |
| Control (no additive) | 26.9 | 12.0 | 10.6 | 9.8 | — | 9.0 |

What is claimed is:

1. A stabilized composition of modified polyphenylene oxide, comprising a graft polymer which is obtained by polymerizing a styrene-type compound in the presence of a polyphenylene oxide with or without a rubber-like polymer and has incorporated therewith a. 0.1 to 10 percent by weight based on said graft polymer of at least one sterically hindered phenol selected from the group consisting of monophenols represented by the general formula,

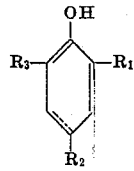

wherein $R_1$ and $R_3$ are hydrocarbon groups having one to 20 carbon atoms, and $R_2$ is a hydrogen atom or a hydrocarbon group having one to 20 carbon atoms; bisphenols represented by the general formula,

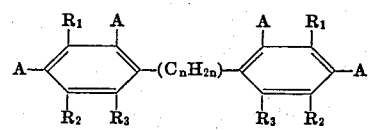

wherein $R_1$, $R_2$ and $R_3$ are hydrogen atoms or hydrocarbon groups having one to 20 carbon atoms, one of two A's in each ring is a hydroxyl group, the other A in each ring is the same as $R_1$, $R_2$ or $R_3$, and $n$ is an integer of 0 to 20; trisphenols represented by the general formula,

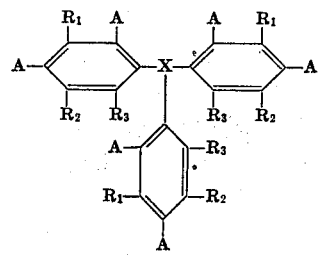

wherein $R_1$, $R_2$ and $R_3$ are hydrogen atoms or hydrocarbon groups having one to 20 carbon atoms, one of two A's in each ring is a hydroxyl group, the other A in each ring is the same as $R_1$, $R_2$ or $R_3$, and X is a trivalent hydrocarbon group having one to 20 carbon atoms; trisphenols represented by the general formula,

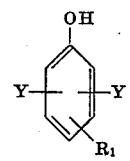

wherein $R_1$ is a hydrocarbon group having one to 20 carbon atoms, Y is a group of the formula,

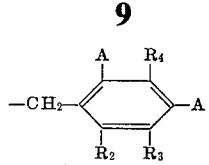

wherein $R_2$, $R_3$ and $R_4$ are hydrogen atom or hydrocarbon groups having one to 20 carbon atoms, one of two A's is a hydroxyl group and the other A is the same as $R_2$, $R_3$ or $R_4$; and thiobisphenols; and (b) 0.1 to 10 percent by weight based on said graft polymer of at least one compound selected from the group consisting of thioethers of carboxylic acid esters represented by the general formula,

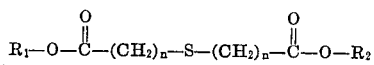

wherein $R_1$ and $R_2$ are hydrocarbon groups having six to 20 carbon atoms, and $n$ is an integer of 1 to 20, preferably 1 to 6; trialkyl phosphites and trialkyl or triaryl thiophosphites represented by the general formulas,

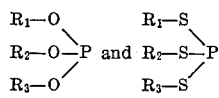

respectively, wherein $R_1$, $R_2$ and $R_3$ are aliphatic or aromatic hydrocarbon groups having six to 20 carbon atoms; and arylamines represented by the general formulas,

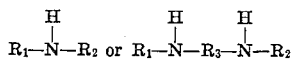

wherein $R_1$ and $R_2$ are aromatic hydrocarbon groups having six to 10 carbon atoms, and $R_3$ is an aromatic hydrocarbon group having six carbon atoms.

2. A stabilized composition of modified polyphenylene oxide according to claim 1, wherein the sterically hindered monophenols are selected from the group consisting of 2-methyl-6-tert-butylphenol, 2,6-di-tert-butyl-phenol, 2,6-di-tert-butyl-p-cresol, 2,6-dicyclohexyl-p-cresol, 2,6-diisopropyl-4-ethylphenol, 2,6-di-tert-amyl-p-cresol, 2,6-di-tert-octyl-4-n-propylphenol, 2,6-dicyclohexyl-4-n-octylphenol, 2-isopropyl-4-methyl-6-tert-butyl-phenol, 2-isobutyl-4-ethyl-6-tert-hexylphenol, 2-tert-butyl-4-ethyl-6-tert-octylphenol, 2-cyclohexyl-4-n-butyl-6-isopropylphenol, and 2,6-di-tert-butyl-4-laurylphenol.

3. A stabilized composition of modified polyphenylene oxide according to claim 1, wherein the sterically hindered bisphenols are selected from the group consisting of 2,2'-methylenebis(4-methyl-6-tert-butylphenol), 4,4'-isopropylidenebis(2-tert-butylphenol), 4,4'-methylenebis(2,6-di-tert-butyl-phenol), 2,2'-methylenebis(p-cresol), 2,2'-methylenebis-(4,6-dimethylphenol), 4,4'-methylenebis(6-tert-butyl-o-cresol), 2,2'-ethylidenebis(4,6-dimethylphenol), 2,2'-ethylidenebis(4-methyl-6-tert-butylphenol), 4,4'-bis(2-methyl-6-tert-butylphenol), 4,4'-bis(2,6-di-tert-butylphenol), and 2,2'-bis(4-methyl-6-tert-butylphenol).

4. A stabilized composition of modified polyphenylene oxide according to claim 1, wherein the sterically hindered trisphenols are selected from the group consisting of 1,1,3-tri(3-tert-butyl-4-hydroxyphenol)butane, 1,1,3-tri(2-methyl-4-hydroxy-5-tert-butyl)butane, 2,6-di(2-hydroxy-5-methylbenzyl)-4-methylphenol, 2,6-di(4-hydroxybenzyl)-4-methylphenol, 2,6-di(2-hydroxy-3-tert-butyl-5-methylbenzyl)-4-methylphenol, and 2,6-di(2-hydroxy-3-tert-butyl-5-methylbenzyl)-4-nonylphenol.

5. A stabilized composition of modified polyphenylene oxide according to claim 1, wherein the thiobisphenols are selected from the group consisting of 2,2'-thiobis(4-methyl-6-tert-butyl-phenol), 2,2'-thiobis(4-isopropyl-6-tert-butylphenol), 4,4'-thiobis(3-methyl-6-tert-butylphenol), and 4,4'-thiobis(3-methyl-6-tert-amylphenol).

6. A stabilized composition of modified polyphenylene oxide according to claim 1, wherein the thioethers of carboxylic acid esters are selected from the grouping consisting of dilauryl thiodipropionate, distearyl thiodipropionate, dihexyl thiodibutyrate, and dibutyl thiodicaproate.

7. A stabilized composition of modified polyphenylene oxide according to claim 1, wherein the trialkyl phosphites are selected from the group consisting of trilauryl phosphite, tristearyl phosphite, tricyclohexyl phosphite, tripalmityl phosphite, and tri(2-ethylhexyl) phosphite.

8. A stabilized composition of modified polyphenylene oxide according to claim 1, wherein the triaryl phosphites are selected from the group consisting of tribenzyl phosphite and tri(2,4-di-tert-butyl-5-methylphenyl) phosphite.

9. A stabilized composition of modified polyphenylene oxide according to claim 1, wherein the trialkyl thiophosphites are selected from the group consisting of trilauryl trithiophosphite, tristearyl trithiophosphite, tribenzyl trithiophosphite, tricyclohexyl trithiophosphite, and tripalmityl trithiophosphite.

10. A stabilized composition of modified polyphenylene oxide according to claim 1, wherein the arylamines are selected from the group consisting of phenyl-$\alpha$-naphthyl amine, phenyl-$\beta$-naphthylamine, N-N'-di-$\beta$-naphthyl-p-phenylenediamine, and N,N'-diphenyl-p-phenylenediamine.

11. A method for preparing a stabilized composition of modified polyphenylene oxide, which comprises incorporating in a graft polymer obtained by polymerizing a styrene-type compound in the presence of a polyphenylene oxide with or without a rubber-like polymer with (a) 0.1 to 10 percent by weight based on said graft polymer of at least one sterically hindered phenol selected from the group consisting of monophenols represented by the general formula,

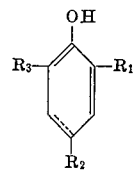

wherein $R_1$ and $R_3$ are hydrocarbon groups having one to 20 carbon atoms, and $R_2$ is a hydrogen atom or a hydrocarbon group having one to 20 carbon atoms; bisphenols represented by the general formula,

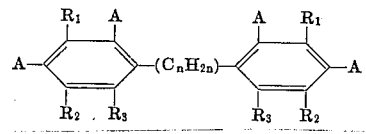

wherein $R_1$, $R_2$ and $R_3$ are hydrogen atoms or hydrocarbon groups having one to 20 carbon atoms, one of two A's in each ring is a hydroxyl group, the other A in each ring is the same as $R_1$, $R_2$ or $R_3$, and $n$ is an integer of 0 to 20; trisphenols represented by the general formula,

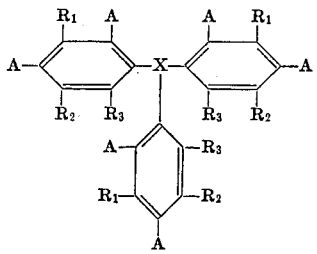

wherein $R_1$, $R_2$ and $R_3$ are hydrogen atoms or hydrocarbon groups having one to 20 carbon atoms, one of two A's in each ring is a hydroxyl group, the other A in each ring is the same as $R_1$, $R_2$ or $R_3$, and X is a trivalent hydrocarbon group having one to 20 carbon atoms; trisphenols represented by the general formula,

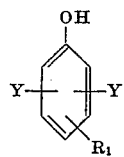

wherein $R_1$ is a hydrocarbon group having one to 20 carbon atoms, Y is a group of the formula,

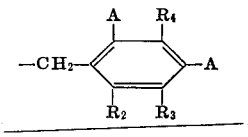

where $R_2$, $R_3$ and $R_4$ are hydrogen atoms or hydrocarbon groups having one to 20 carbon atoms, one of two A's is a hydroxyl group and the other A is the same as $R_2$, $R_3$ or $R_4$; and thiobisphenols; and (b) 0.1 to 10 percent by weight based on said graft polymer of at least one compound selected from the group consisting of thioethers of carboxylic acid esters represented by the general formula,

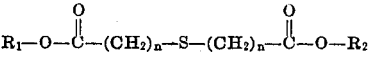

wherein $R_1$ and $R_2$ are hydrocarbon groups having six to 20 carbon atoms, and $n$ is an integer of 1 to 20, preferably 1 to 6; trialkyl or triaryl phosphites and trialkyl or triaryl thiophosphites represented by the formulas,

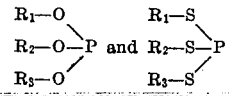

respectively, wherein $R_1$, $R_2$ and $R_3$ are aliphatic or aromatic hydrocarbon groups having six to 20 carbon atoms; and arylamines represented by the general formulas,

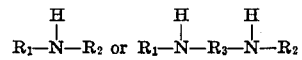

wherein $R_1$ and $R_2$ are aromatic hydrocarbon groups having six to 10 carbon atoms, and $R_3$ is an aromatic hydrocarbon group having six carbon atoms.

12. A method according to claim 11, wherein to the modified polyphenylene oxide are added the compounds of (a) and (b), the composition is mixed in a Henschel mixer, and then milled in an extruder, or alternatively, to a solution of the modified polyphenylene oxide in a solvent are added said compounds of (a) and (b), the composition is mixed, and then the stabilized composition is isolated from the solution.

13. An article fabricated from the stabilized composition of modified polyphenylene oxide according to claim 1.

* * * * *